(12) United States Patent
Wickert et al.

(10) Patent No.: US 7,690,193 B2
(45) Date of Patent: Apr. 6, 2010

(54) PROCEDURE AND DEVICE TO CONTROL A REDUCING AGENT GENERATION SYSTEM

(75) Inventors: Stefan Wickert, Albershausen (DE); Joerg Mosthaf, Muehlacker (DE); Christian Fuchs, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 407 days.

(21) Appl. No.: 11/645,882

(22) Filed: Dec. 27, 2006

(65) Prior Publication Data

US 2007/0175207 A1    Aug. 2, 2007

(30) Foreign Application Priority Data

| Dec. 27, 2005 | (DE) | .......... | 10 2005 062 556 |
| Apr. 24, 2006 | (DE) | .......... | 10 2006 018 955 |
| May 4, 2006 | (DE) | .......... | 10 2006 020 693 |
| May 9, 2006 | (DE) | .......... | 10 2006 021 490 |
| May 11, 2006 | (DE) | .......... | 10 2006 021 987 |
| May 12, 2006 | (DE) | .......... | 10 2006 022 385 |
| May 17, 2006 | (DE) | .......... | 10 2006 022 992 |
| May 18, 2006 | (DE) | .......... | 10 2006 023 338 |
| Sep. 14, 2006 | (DE) | .......... | 10 2006 043 152 |

(51) Int. Cl.
*F01N 3/00* (2006.01)

(52) U.S. Cl. .................. 60/286; 60/274; 60/295; 60/297; 60/301; 60/303

(58) Field of Classification Search ................ 60/274, 60/285, 286, 295, 297, 301, 303
See application file for complete search history.

(56) References Cited

U.S. PATENT DOCUMENTS

| 4,963,332 | A | 10/1990 | Brand et al. | |
| 6,453,662 | B1* | 9/2002 | Lewis et al. | ............ 60/277 |
| 7,063,642 | B1* | 6/2006 | Hu et al. | ............ 477/100 |
| 7,093,427 | B2* | 8/2006 | van Nieuwstadt et al. | ..... 60/286 |
| 7,150,145 | B2* | 12/2006 | Patchett et al. | ............ 60/286 |

(Continued)

FOREIGN PATENT DOCUMENTS

DE      38 25 206      2/1990

(Continued)

OTHER PUBLICATIONS

Werner Weisweiler, "Elimination of Nitrogen Oxides from Oxygen-Containing Automotive Exhaust Gases", Chemistry Engineer Technology, vol. 72, Issue 5, pp. 441-449, 2000.

*Primary Examiner*—Binh Q Tran
(74) *Attorney, Agent, or Firm*—Merchant & Gould P.C.

(57) ABSTRACT

A method of controlling a reducing agent generation system of an internal combustion engine includes generating a reagent substance in a form of pulses and delivered to an exhaust gas duct of the internal combustion engine upstream of an SCR-catalytic converter for the selective catalytic reduction of the nitrogen oxides contained in an exhaust gas. A catalytic converter model is used to model a reagent substance fill level of the SCR-catalytic converter and a closed-loop feedback control system compares the modeled reagent substance fill level with a storage set point. A reagent substance demand signal is generated that at least releases a reagent substance pulse when a difference between the storage set point and the reagent substance fill level exceeds a specified threshold value.

8 Claims, 3 Drawing Sheets

U.S. PATENT DOCUMENTS

Figure 1:
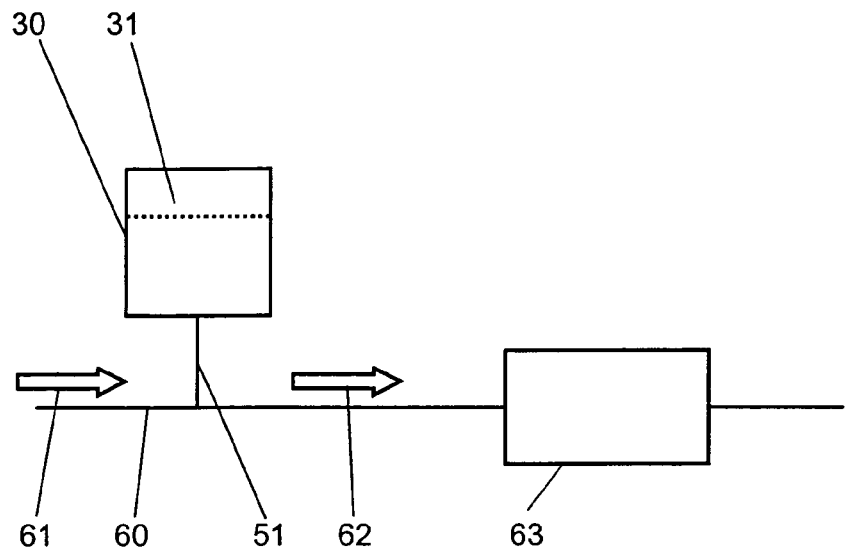

| | | |
|---|---|---|
| 2004/0128982 A1 | 7/2004 | Patchett et al. |
| 2006/0000202 A1* | 1/2006 | Ripper et al. ............ 60/286 |
| 2006/0101809 A1 | 5/2006 | Bodo et al. |

FOREIGN PATENT DOCUMENTS

| | | |
|---|---|---|
| DE | 199 22 961 C2 | 11/2000 |
| DE | 199 31 007 | 1/2001 |
| DE | 101 39 142 A1 | 2/2003 |
| DE | 103 01 603 | 7/2004 |
| DE | 10 2004 031 624 A1 | 2/2006 |
| FR | 2 796 154 | 1/2001 |
| FR | 2 822 498 | 9/2002 |
| FR | 2 850 132 | 7/2004 |
| GB | 2 375 059 | 11/2002 |
| WO | WO 01/14702 A1 | 3/2001 |

* cited by examiner

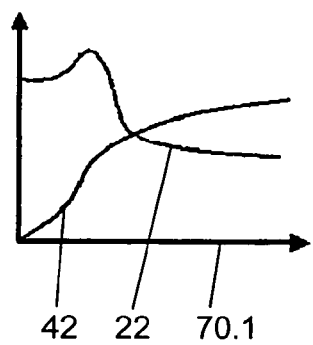
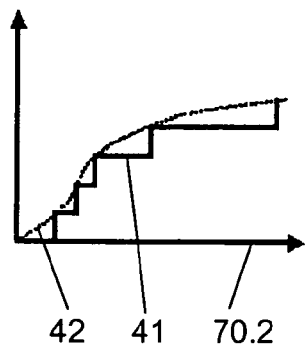
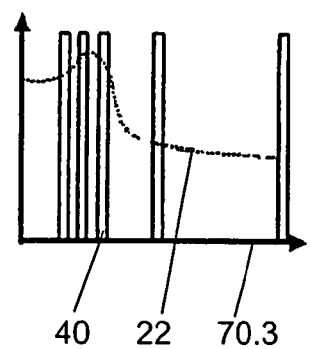
Fig. 3a          Fig. 3b          Fig. 3c
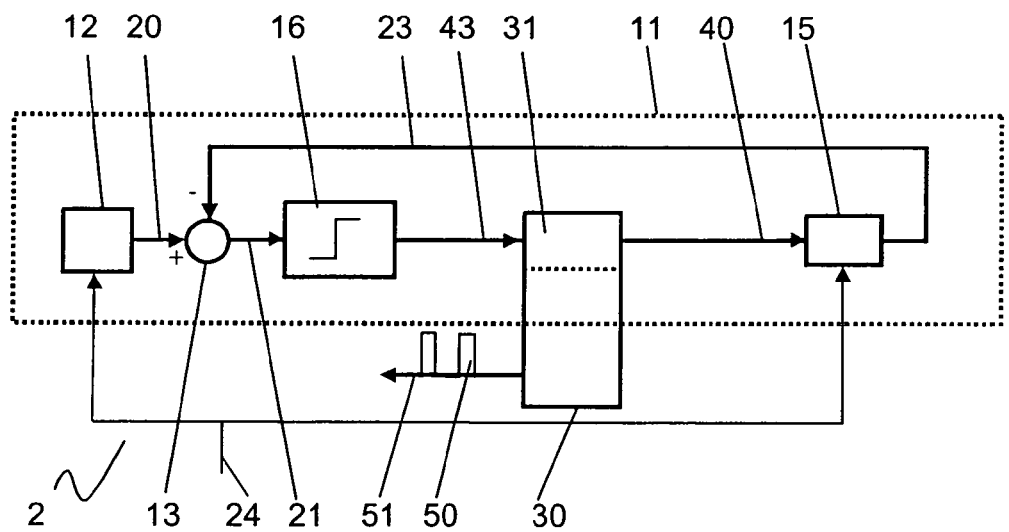
Fig. 4

PROCEDURE AND DEVICE TO CONTROL A REDUCING AGENT GENERATION SYSTEM

The invention concerns a procedure to control a reducing agent generation system of an internal combustion engine, in which the reagent substance is produced in the form of pulses by the reducing agent generation system and is delivered to an exhaust gas duct of the internal combustion engine in front of the SCR-catalytic converter for the selective catalytic reduction of the nitrogen oxides contained in the exhaust gas. The procedure further includes a catalytic converter model in which the fill level of the reagent substance of the SCR-catalytic converter is modeled and a closed-loop control which compares the reagent substance fill level with a storage set point. The invention additionally concerns a corresponding device to implement the procedure.

In connection with future statutory specifications in regard to the nitrogen oxide emissions of motor vehicles, a corresponding exhaust gas aftertreatment is required. The selective catalytic reduction (SCR) can be deployed for the reduction of the $NO_x$ emissions ($NO_x$ removal) from internal combustion engines, especially from diesel engines with chronologically predominant lean exhaust gas, i.e. oxygen rich exhaust gas. In so doing, a defined amount of a selectively active reducing agent is added to the exhaust gas. This can, for example, be in the form of ammonia, which is metered directly in a gaseous state, or also can be obtained from a precursor substance in the form of urea or from a urea-water-solution (HWL).

In the German patent DE 10139142 A1, an emission control system of an internal combustion engine is described, in which a SCR-catalytic converter is deployed for the reduction of the $NO_x$ emissions, which reduces the nitrogen oxides contained in the exhaust gas to nitrogen using the reagent substance ammonia. The ammonia is obtained from a urea-water-solution (HWL) in a hydrolysis catalytic converter disposed upstream in front of the SCR-catalytic converter. The hydrolysis catalytic converter converts the urea contained in the HWL to ammonia. In a second step the ammonia reduced the nitrogen oxides to nitrogen, whereby water is produced as a byproduct. The exact sequence has been described adequately in the trade literature (ref. WEISSWELLER in CIT (72), pages 441-449, 2000). The HWL is provided in a reagent substance tank.

A disadvantage in this procedure is that the HWL is consumed during the operation of the internal combustion engine. The consumption is thereby around 4% of the fuel consumption. The supply of the urea-water-solution would correspondingly have to be ensured over a wide area, for example at gas stations. An additional disadvantage of the procedure lies with the necessary operating temperature range. The hydrolysis reaction of the urea-water-solution occurs quantitatively only at temperatures above 200° C. These temperatures in the exhaust gas are achieved, for example, in diesel motors only after extended durations of operation. Due to depositions, blockages at the metering unit can occur at temperatures under 200° C. which at least hinder the supply of the urea-water-solution into the exhaust gas tract. Additionally a metering of the urea-water-solution at temperatures under 200° C. lead to the obstruction of the necessary catalytic characteristics at the hydrolysis catalytic converter or at the SCR-catalytic converter. This is due to a polymerization.

In the German patent DE 199 22 961 C2 an exhaust gas emission control system is described for the purification of the exhaust gas of a combustion source, especially of a combustion engine of a motor vehicle, at least from the nitrogen oxides contained therein with an ammonia generating catalytic converter for the generation of ammonia using components of at least a part of the exhaust gas emitted from the combustion source during the ammonia generation-operating phases and with a nitrogen oxide reducing catalytic converter subsequently connected to the ammonia generating catalytic converter for the reduction of the nitrogen oxides contained in the exhaust gas emitted from the combustion source using the generated ammonia as the reducing agent. Provision is thereby made for a nitrogen oxide generating unit external to the combustion source for the enrichment of the exhaust gas delivered to the ammonia generating catalytic converter with the nitrogen oxide produced by the unit itself during the ammonia generation-operating phases. A plasma generator is proposed, for example, as a nitrogen oxide generating unit for the plasma engineered oxidation of nitrogen, which is contained in a gas stream fed to the unit, into nitrogen oxide. The required hydrogen to generate the ammonia is produced during the ammonia generation-operating phases by means of the operation of the combustion source with a rich, i.e. fuel rich, air ratio.

A plasma chemical procedure to generate a hydrogen rich gas mixture is described in the patent WO 01/14702 A1. A rich fuel-air-mixture is thereby addressed in an arc preferably during $PO_x$ conditions.

In order to avoid the transport of an additional operating supply item, a plasma procedure was proposed by a patent applicant for the on-board-generation of reducing agents in a document, which is still unpublished. In this process the necessary ammonia for reducing the nitrogen oxides is manufactured as needed in the motor vehicle from non-toxic substances and subsequently delivered to the SCR-process. An acceptable solution with regard to the fuel consumption is provided by an intermittently operated procedure for the generation of ammonia, which is likewise proposed in this document. In so doing the reducing agent ammonia is supplied in the form of pulses. This procedure, repectively this device, will be referred to below as the RGS-procedure (Reductant generating system) or reducing agent generation system.

In order to assure a sufficient amount of the reducing agent stored in the SCR-catalytic converter during unsteady and dynamic operating conditions, a procedure to operate a catalytic converter used for the purification of the exhaust gas of an internal combustion engine is described in the German patent DE 102004031624 for the HWL-procedure, in which upstream from the catalytic converter, a reagent substance required in the catalytic converter is introduced into an exhaust gas duct. In so doing the reagent substance fill level of the catalytic converter is controlled by an open loop or closed-loop control to a specified storage set point. The reagent substance fill level of the catalytic converter is ascertained by means of a model from the measured or calculated emissions before the catalytic converter of the internal combustion engine, the actual calculated metering of the reducing agent and the actual calculated coefficient of efficiency of the catalytic converter. By means of the closed-loop control of the fill level of the catalytic converter, a sufficient amount of the stored reducing agent for the reduction of large amounts of nitrogen oxide during peaks of demand is assured on the one hand. On the other hand, a reagent substance backlash is avoided upon achieving the maximum storage capacity.

The procedure proceeds from a continuous supply of the reducing agent in sufficient amounts and is on account of the then large closed-loop control deviations taking place not suitable for an intermittent supply of the reducing agent, as it occurs by way of a reducing agent generation system.

It is, therefore, the task of the invention, to supply a procedure and a device, in which the fill level of an SCR-catalytic converter can be controlled in a closed-loop during an intermittent delivery of the reducing agent.

The task which concerns the procedure of the invention is solved according to the characteristics of the patent claims 1 and 2. Advantageous modifications are in each case described in the sub-claims.

Provision is made according to them that by means of a chronological integral with regard to the necessary metering of the reagent substance, an integrated reagent substance demand is formed; and by means of a chronological integral with regard to a metered amount of reagent substance, an integrated reagent substance signal is formed and that a reagent substance demand signal is generated, which at least releases a reagent substance pulse, if the difference between the integrated reagent substance demand and the integrated reagent substance signal exceeds a specified threshold value. The actual required metering of the reagent substance can thereby be determined in a preferably pure mathematically depicted closed-loop feedback control system. By means of the comparison of the continuously operating integrated reagent substance demand with the integral of the reagent substance amount delivered in the form of pulses above a threshold value, an intermittent reagent substance demand is achieved. By means of an appropriate selection of the threshold value, having the amount of the stored reagent substance fall short of a minimum amount can be avoided. Also having the storage capacity of the SCR-catalytic converter exceeded after a pulse shaped reagent substance addition can be avoided.

An intermittently working closed-loop control feedback system is thereby achieved, in that a reagent substance demand signal is generated, which at least releases a reagent substance pulse, if the difference between the storage set point and the reagent substance fill level exceeds a specified threshold value. Also in this case by an appropriate selection of the threshold value, having the amount of the stored reagent substance fall short of a required minimum amount can be avoided or having the storage capacity of the SCR-catalytic converter exceeded after a pulse shaped reagent substance addition can be avoided.

If provision is made for the amount of the reagent substance dispensed from the reducing agent generation system to be delivered in the form of a reagent substance signal to the catalytic converter model, the information regarding the amount of the reagent substance actually metered to the SCR-catalytic converter is thus available to the catalytic converter model, from which the actual fill level of the SCR-catalytic converter can be calculated when the reagent substance consumption is taken into account.

According to a preferred variation of embodiment of the procedures, provision is made for the specified threshold value to correspond to a reagent substance pulse or a multiple of it. In so doing, the required amount of the reagent substance can be delivered exactly to achieve the storage set point. The smallest deviation of the reagent substance fill level from the specified storage set point is achieved, if the threshold value corresponds to a reagent substance pulse.

In that the storage set point is specified as a function of the temperature of the SCR-catalytic converter, the temperature dependence of the storage capacity and of the catalytic activity of the SCR-catalytic converter can be taken into account during the reagent substance demand.

An exact determination of the reagent substance fill level of the SCR-catalytic converter as a function of the amount of the reagent substance, which has been delivered, can thereby be achieved, in that the reagent substance fill level is ascertained as a function of a $NO_x$ mass flow supplied to the SCR-catalytic converter and/or leaving the SCR-catalytic converter and/or as a function of the temperature of the SCR-catalytic converter and/or a reagent substance backlash and/or as a function of the coefficient of efficiency of the SCR-catalytic converter. The $NO_x$ mass flows can thus be determined using the operating parameters of the internal combustion engine.

The procedure described is especially applicable to diesel engines or lean engines, which have a reducing agent generation system.

The task concerning the device of the invention is solved according to the characteristics of the patent.

Provision is made according to that for a closed-loop control unit with a closed-loop feedback system and/or with an integrator and/or a reference stage and/or with an open-loop control unit as part of a control device program to be in a motor vehicle with a reducing agent generation system. Provision can be made thereby for the control device to be in any case an engine management system of overriding importance for the operation of a modern internal combustion engine. The essential operational data necessary to implement the procedure according to the invention are then made available to the engine management system or the control device can be integrated into the control unit of the reducing agent generation system.

DRAWINGS

Figure 2:
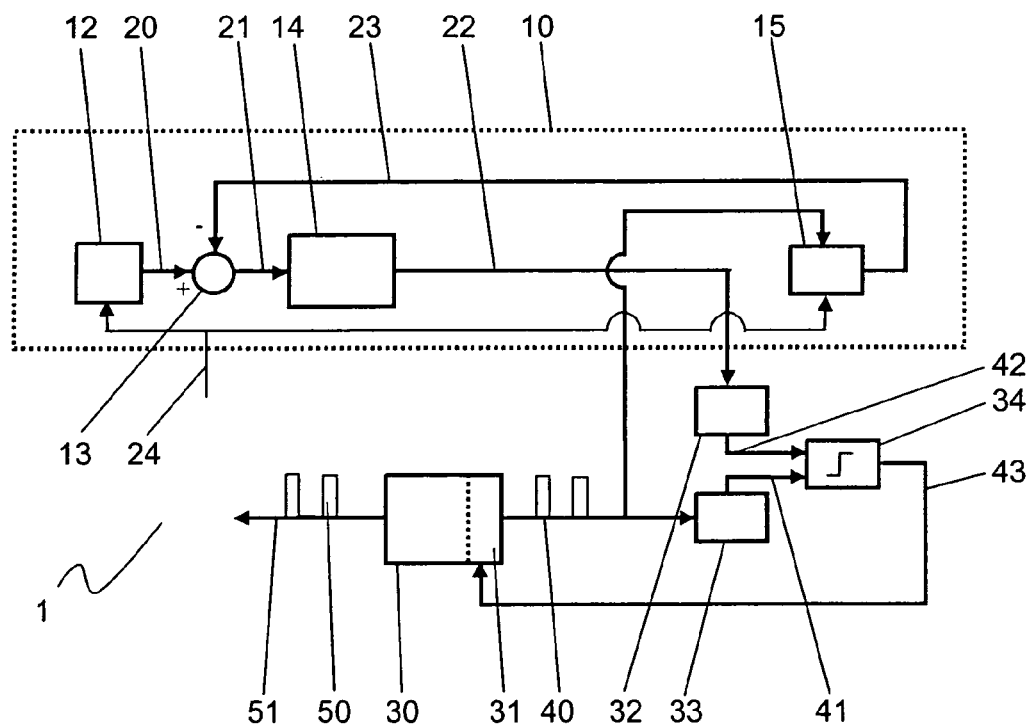
Figure 5A:
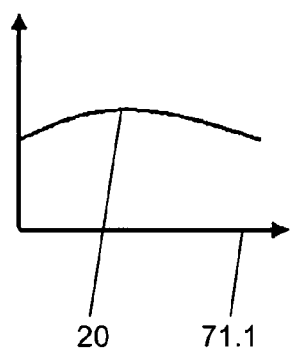
Figure 5B:
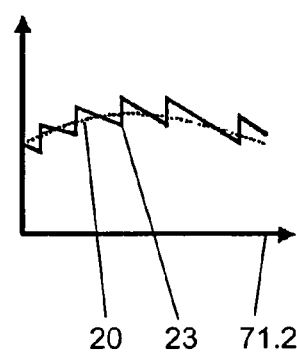
Figure 5C:
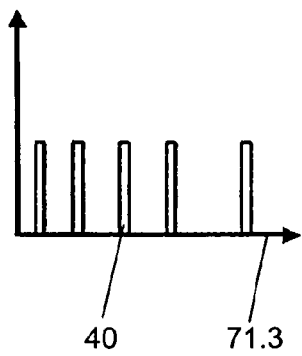

The invention is explained below in detail using the examples of embodiment depicted in the figures. The following are shown:

FIG. 1 a schematic depiction of an exhaust gas aftertreatment system of an internal combustion engine with a reducing agent generation system, FIG. 2 a schematic depiction of a first closed-loop control unit to control a reducing agent generation system with a continuously working closed-loop feedback control system, FIG. 3*a*-3*c* the chronological progression of the signals in the first closed-loop control unit according to FIG. 2, FIG. 4 a schematic depiction of a second closed-loop control unit to control the reducing agent generation system with an intermittently working closed-loop feedback control system and FIG. 5*a*-5*c* the chronological progression of the signals in the second closed-loop control unit according to FIG. 4.

FIG. 1 shows schematically an exhaust gas aftertreatment system of an unspecified internal combustion engine with a reducing agent generation system 30, in which the procedure according to the invention can be applied.

Exhaust gas of an internal combustion engine is directed corresponding to the depicted direction of flow 61 in an exhaust gas duct 60. The reagent substance is metered to the exhaust gas in the direction of flow in front of an SCR-catalytic converter 63 by a reducing agent generation system 30 by way of a reagent substance feed 51. The mixture of exhaust gas and reagent substance is delivered to the SCR-catalytic converter 63 corresponding to the direction of flow 62. Provision is made for a control unit 31 to control the reducing agent generation system 30.

Provision is made in the depicted example of embodiment for ammonia to be used as the reagent substance, which is supplied in the form of pulses to the reducing agent generation system 30 and is stored in the SCR-catalytic converter 63. SCR-catalytic converters 63 work according to the principle of selective catalytic reduction, in which nitrogen oxides are reduced to nitrogen and water in exhaust gases containing oxygen by means of the stored reducing agent ammonia.

In order to guarantee a sufficient amount of the reagent substance for the most complete removal of nitrogen oxides from the exhaust gas in unsteady, dynamic operating conditions of the internal combustion engine with correspondingly occurring peaks of emitted nitrogen oxides, a minimal amount of the reagent substance stored in the SCR-catalytic converter 63 is to be assured. On the other band, the maximum storage capacity of the SCR-catalytic converter 63 for the reagent substance may not be exceeded in order to avoid a reagent substance backlash. The fill level of the SCR-catalytic converter 63 is to be adjusted correspondingly. The storage capacity of the SCR-catalytic converter 63 is temperature dependent and decreases with a rising temperature. Furthermore the catalytic activity of the SCR-catalytic converter 63 is dependent upon the temperature. The optimal fill level of the SCR-catalytic converter 63 is thus at least dependent upon the temperature of the SCR-catalytic converter 63.

In FIG. 2 a first closed-loop control unit 1 to control a reducing agent generation system 30 with a continuously working closed-loop feedback control system 10 is depicted schematically.

A set point specification 12, a summing agent 13, a controller 14 and a catalytic converter model 15 are assigned to the closed-loop feedback control system 10. A temperature signal 24, which indicates the temperature of the SCR-catalytic converter 63 depicted in FIG. 1, is supplied to the set point specification 12 and to the catalytic converter model 15.

The set point specification 12 transmits a storage set point 20, which is supplied to the summing agent 13. Additionally a reagent substance fill level 23 of the SCR-catalytic converter 63 is supplied as an output signal of the catalytic converter model 15 to the summing agent 13, from which the summing agent forms a control differential 21, which is provided to the controller 14 as an input parameter. A reagent substance demand 22, which represents the necessary metering of the reagent substance to maintain the desired fill level in the SCR-catalytic converter 63, is provided to a first integrator 32 as an output parameter of the controller 14.

The first integrator 32 forms an integrated reagent substance demand 42 from the reagent substance demand 22. A reagent substance signal 40, which is dispensed by the control unit 31 of the reducing agent generation system 30, is provided to a second integrator 33, which forms an integrated reagent substance signal 41. The reagent substance signal 40 is additionally supplied to the catalytic converter model 15 as an input parameter. The integrated reagent substance demand 42 and the integrated reagent substance signal 41 are fed to a comparison stage 34, whose output signal, a reagent substance demand signal 43, is provided to the control unit 31 of the reducing agent generation system 30. Reagent substance pulses 50 are delivered via the reagent substance feed 51 to the exhaust gas duct 60 depicted in FIG. 1.

The catalytic converter model 15 is embodied in a known manner, so that it at least calculates the reagent substance fill level 23 from the reagent substance stream flowing into the SCR-catalytic converter 63, which is depicted by the reagent substance signal 40. Additional parameters, which can be used to determine the reagent substance fill level 23 are the temperature of the SCR-catalytic converter 63, the incoming $NO_x$ mass flow with the exhaust gas, the $NO_x$ mass flow leaving the SCR-catalytic converter 63, the reagent substance backlash as well as the calculated coefficient of efficiency of the SCR-catalytic converter 63. For a simplified calculation, the $NO_x$ mass flows can be referenced to the amount of the reagent substance which has been delivered.

The procedure according to the invention is implemented in the closed-loop control unit 1 as is described as follows: The set point specification 12 ascertains at least on the basis of the temperature of the SCR-catalytic converter 63 the desired reagent substance fill level and provides this as a storage set point 20 to the summing agent 13. The catalytic converter model 15 calculates the reagent substance fill level 23. The summing agent 13 forms the control differential 21 from the reagent substance fill level 23 and the storage set point 20, from which the controller 14 determines the reagent substance demand 22, which is required in order to adjust the fill level of the SCR-catalytic converter 63 to the storage set point 20.

The conversion of the continuously ascertained reagent substance demand 22 into an intermittent reagent substance demand (in the manner in which this is converted by the pulse shaped driven reducing agent generation system 30) results by way of the two integrators 32, 33 and the comparison stage 34. The first integrator 32 sums the reagent substance demand 22 into a steadily rising, integrated reagent substance demand 42 during the operation of the internal combustion engine. The second integrator 33 sums the pulse shaped proceeding reagent substance signal 40, which corresponds to the actual reagent substance pulses 50 given off by the reducing agent generation system 30 and as a result corresponds to the reagent substance amounts, to a correspondingly step shaped proceeding, integrated reagent substance signal 41. As long as no reagent substance pulse 50 is given off by the reducing agent generation system 30, the reagent substance signal 41 stays constant, while the integrated reagent substance demand 42 increases. If the difference between the integrated reagent substance demand 42 and the integrated reagent substance signal 41 exceeds the threshold value specified by the comparison stage 34, a reagent substance pulse 50 is demanded via a reagent substance signal 41 and is released by the control unit 31. The reagent substance signal 40 transmits the amount of the reagent substance released to the second integrator 33, whereby the integrated reagent substance signal 41 increases correspondingly.

The amount of the reduction substance released to the SCR-catalytic converter 63 is signaled to the catalytic converter model 15 by way of the reagent substance signal 40. The catalytic converter model 15 then calculates anew the actual reagent substance fill level 23 of the SCR-catalytic converter 63 from this signal.

Preferably the threshold in the comparison stage 34 is predetermined in such a way that it corresponds to the reagent substance amount of a reagent substance pulse 50 or a common multiple of it. The slightest deviation of the fill level in the SCR-catalytic converter 63 from the set point is maintained if the threshold corresponds to a single reagent substance pulse 50.

The complete closed-loop control unit 1, not including the reagent substance generation system 30 and the reagent substance feed 50, is preferably implemented as a part of a control device program. In so doing, the control device program can be deposited in the control unit 31 of the reducing agent generation system 30 or an overriding engine management system.

The FIGS. 3a-3c show the chronological progression of the signals indicated for the control unit 1 in FIG. 2, which are also referred to in the following description.

In FIG. 3a the reagent substance demand 22 released by the controller 14 and the integrated reagent substance demand 42 formed from it through integration are plotted against a time axis 70.1. The reagent substance demand 22 continuously changes corresponding to a variable reagent substance consumption, for example as a result of the changing operating situations of the internal combustion engine. The integrated reagent substance demand 42 increases steadily in a corresponding manner.

In FIG. 3b the integrated reagent demand 42 and the integrated reagent substance signal 41 are depicted as a function of the time axis 70.2. The integrated reagent substance demand 42 increases steadily. The integrated reagent substance signal remains constant until a reagent substance pulse 50 is released. This reagent substance pulse 50 is released as soon as the difference between the integrated reagent substance demand 42 and the reagent substance signal 41 exceed the threshold value specified by the comparison stage 34. The threshold value is selected in the example of embodiment depicted, so that it corresponds to a reagent substance pulse 50 and so that the integrated reagent substance signal 41 corresponds to the value of the integrated reagent substance demand 42 after a reagent substance pulse 50.

FIG. 3c shows the reagent substance demand 22 and the reagent substance signal 40 as a function of the time axis 70.3. The reagent substance signal 40 corresponds to the reagent substance pulses 50 released by the reducing agent generation system 30. During a high reagent substance demand 22, reagent substance pulses 50 are released in a shorter chronological sequence, while during a low reagent substance demand 22, only isolated reagent substance pulses 50 are demanded. The amount of the reagent substance released to the SCR-catalytic converter 63 is thus established by way of the frequency of the reagent substance pulses 50.

FIG. 4 shows an alternative embodiment of the closed-loop control unit 2 to control the reducing agent generation system 30 with an intermittently working closed-loop feedback control system 11.

In addition to the components already described in FIG. 2: set point specification 12, summing agent 13, and catalytic converter model 15, another comparison stage 16 and the control unit 31 of the reducing agent generation system 30 are assigned to the closed-loop feedback control system 11. The temperature signal 24, which indicates the temperature of the SCR-catalytic converter, is provided to the set point specification 12 and the catalytic converter model 15.

The set point specification 12 forms as a function of at least the SCR-catalytic converter temperature the storage set point 20, which is provided to the summing agent 13. The catalytic converter model 15 calculates, likewise with regard to the SCR-catalytic converter temperature, the actual reagent substance fill level 23, which is supplied to the summing agent 13. The summing agent 13 forms the control differential 21 from the two input parameters as an input parameter for the comparison stage 16, which produces from that the reagent substance demand signal 43. The reagent substance demand signal 43 is supplied to the control unit 31 of the reducing agent generation system 30, which on the basis of the reagent substance demand signal 43 releases a reagent substance pulse 50 by way of the reagent substance feed 51 to the SCR-catalytic converter 63. The release of a reagent substance pulse 50 by the control unit 31 is supplied additionally via the reagent substance signal 40 to the catalytic converter model 15, which then calculates anew the actual reagent substance fill level 23.

The triggering of a reagent substance pulse 50 is then released via a corresponding reagent substance demand signal 43, if the control differential 21, that is to say the difference between the storage set point 20 and the reagent substance fill level 23 actually stored in the SCR-catalytic converter 63, is greater than a specified threshold value in the comparison stage 16. The amount of the reagent substance, which is actually released from the reducing agent generation system 30 in the form of pulses to the SCR-catalytic converter 63 by way of the reagent substance signal 40, is available at the catalytic converter model 15, so that from this the actual intermittently proceeding reagent substance fill level 23 can be determined.

Preferably the threshold of the comparison stage 16 is predetermined in such a manner that it corresponds to the amount of reagent substance of a reagent substance pulse 50 or a common multiple of it. The slightest deviation of the fill level in the SCR-catalytic converter 63 from the set point is maintained, if the achievement of the threshold leads to the release of a single reagent substance pulse 50.

The closed-loop feedback control system 11 is preferably implemented as a part of the control device program. In so doing the control device program can be deposited in the control unit 31 of the reducing agent generation system 30 or in an overriding engine management system.

The FIGS. 5a-5c show the chronological progression of the signals indicated for the second closed-loop control unit 2 in FIG. 4, to which the following description refers.

In FIG. 5a the storage set point 20 dispensed by the set point specification 12 is plotted against a time axis 71.1. The storage set point 20 changes, for example, as a function of the actual temperature of the SCR-catalytic converter 63.

In FIG. 5b the storage set point 20 and the reagent substance fill level 23 are plotted against a time axis 71.2. The reagent substance fill level 23 sinks as a result of the consumption of the reagent substance in the SCR-catalytic converter 63 until the difference between the storage set point 20 and the reagent substance fill level 23 achieves the threshold value deposited in the comparison stage 16 depicted in FIG. 4. A reagent substance pulse 50 is then released and the catalytic converter model 15 receives a signal, whereby the reagent substance fill level 23 calculated from the catalytic converter model 15 increases.

In the depicted form of embodiment of the invention, the threshold is selected smaller than the corresponding amount of the reagent substance, which is delivered to the SCR-catalytic converter 63 by means of a reagent substance pulse 50. The reagent substance fill level 23 oscillates correspondingly around the storage set point 20. If the threshold corresponds to the amount of the reagent substance of a reagent substance pulse 50, the reagent substance fill level 23 jumps to the storage set point 20 after a reagent substance pulse 50. By means of the selection of the threshold, the relative position of the progression of the reagent substance fill level 23 can thus be determined to the progression of the storage set point 20. The number of the reagent substance pulses 50 released in each case as well as the amount of reagent substance generated by each reagent substance pulse 50 determine the amplitude of the reagent substance fill level 23.

FIG. 5c shows the reagent substance signal 40 as a function of a time axis 71.3. The reagent substance signal 40 corresponds to the reagent substance pulses 50 released by the reducing agent generation system 30. A pulse of the reagent substance signal 40 is released, if the difference between the storage set point 20 and the reagent substance fill level 23 exceeds the specified threshold value.

Basically the procedure and the device can be deployed in all motor vehicles with diesel or lean engines, which are driven by other fuels, in which a reducing agent generation system is deployed.

The invention claimed is:
1. A method of controlling a reducing agent generation system of an internal combustion engine, wherein a reagent substance is generated in a form of pulses and delivered to an exhaust gas duct of the internal combustion engine upstream of an SCR-catalytic converter for the selective catalytic reduction of the nitrogen oxides contained in an exhaust gas with a catalytic converter model, the method comprising:

modeling a reagent substance fill level of the SCR-catalytic converter;

comparing the modeled reagent substance fill level with a storage set point with a closed-loop feedback control system;

generating a reagent substance demand signal that at least releases a reagent substance pulse to temporarily increase the reagent substance fill level to a value greater than the storage set point when a difference between the storage set point and the reagent substance fill level exceeds a specified threshold value.

2. A method according to claim 1, wherein an amount of the reagent substance released by the reducing agent generation system is delivered to the catalytic converter model in the form of a reagent substance signal.

3. A method according to claim 1, wherein the specified threshold value corresponds to the reagent substance pulse or a multiple thereof.

4. A method according to claim 1, wherein the storage set point is specified as a function of the temperature of the SCR-catalytic converter.

5. A method according to claim 1, wherein modeling the reagent substance fill level is includes modeling as a function of a NOx mass flow delivered to or leaving the SCR-catalytic converter or as a function of a temperature of the SCR-catalytic converter, a reagent substance backlash, or the coefficient of efficiency of the SCR-catalytic converter.

6. A method according to claim 1, wherein modeling a reagent substance fill level of the SCR-catalytic converter includes modeling on a diesel engines or a lean engine that have a reducing agent generation system.

7. A device configured to control a reducing agent generation system of an internal combustion engine, wherein a reagent substance is generated in a form of pulses and delivered to an exhaust gas duct of the internal combustion engine upstream of a SCR-catalytic converter for selective catalytic reduction of nitrogen oxides contained in an exhaust gas, with a catalytic converter model, in which a reagent substance fill level of the SCR-catalytic converter is modeled and with a closed-loop feedback control system, wherein the modeled reagent substance fill level is compared with a storage set point, the device including a closed-loop control unit with the closed-loop feedback control system, an integrator configured to generate a reagent substance demand signal that at least releases a reagent substance pulse to temporarily increase the reagent substance fill level to a value greater than the storage set point when a difference between the storage set point and the reagent substance fill level exceeds a specified threshold value, an open-loop control unit are part of a control device program in a control device in a motor vehicle with a reducing agent generation system.

8. A method of controlling a reducing agent generation system of an internal combustion engine, wherein a reagent substance is generated in a form of pulses and delivered to an exhaust gas duct of the internal combustion engine upstream of an SCR-catalytic converter for the selective catalytic reduction of the nitrogen oxides contained in an exhaust gas, the method comprising:

modeling a reagent substance fill level of the SCR-catalytic converter;

comparing the modeled reagent substance fill level with a storage set point with a closed-loop feedback control system;

generating a reagent substance demand signal that at least releases a reagent substance pulse when a difference between the storage set point and the reagent substance fill level exceeds a threshold value that is than less than an amount of injected reagent such that the reagent fill level oscillates around the storage set point.

* * * * *